(12) United States Patent
Fischer

(10) Patent No.: US 11,259,575 B2
(45) Date of Patent: Mar. 1, 2022

(54) SYSTEMS AND METHODS FOR MAKING GARMENTS

(71) Applicant: Bonnie Fischer, Vienna, VA (US)

(72) Inventor: Bonnie Fischer, Vienna, VA (US)

( * ) Notice: Subject to any disclaimer, the term of this patent is extended or adjusted under 35 U.S.C. 154(b) by 0 days.

(21) Appl. No.: 17/005,872

(22) Filed: Aug. 28, 2020

(65) Prior Publication Data

US 2021/0112886 A1 Apr. 22, 2021

Related U.S. Application Data

(60) Provisional application No. 62/893,861, filed on Aug. 30, 2019.

(51) Int. Cl.
*A41C 5/00* (2006.01)
*A41C 3/12* (2006.01)

(52) U.S. Cl.
CPC .............. *A41C 5/005* (2013.01); *A41C 3/12* (2013.01)

(58) Field of Classification Search
CPC ................................. A41C 3/00; A41C 5/005
USPC ........................................................ 450/39
See application file for complete search history.

(56) References Cited

U.S. PATENT DOCUMENTS

| | | | | |
|---|---|---|---|---|
| 3,799,727 A * | 3/1974 | Howard | ................ | B29C 51/425 |
| | | | | 425/394 |
| 4,036,924 A | 7/1977 | Shishoo et al. | | |
| 4,372,321 A * | 2/1983 | Robinson | ................ | A41C 3/142 |
| | | | | 450/39 |
| 6,966,815 B2 | 11/2005 | Weinerth | | |
| 8,419,503 B2 | 4/2013 | Zhang | | |
| 2005/0093206 A1* | 5/2005 | Huang | .................... | A41C 5/005 |
| | | | | 264/327 |
| 2010/0317256 A1* | 12/2010 | Zhang | .................... | A41C 3/122 |
| | | | | 450/38 |
| 2011/0111674 A1 | 5/2011 | Padula | | |
| 2017/0119063 A1* | 5/2017 | Diaz | .................... | A41C 3/0085 |
| 2019/0216140 A1* | 7/2019 | Turlan-Van Der Hoven | ............... | |
| | | | | A41C 3/144 |

FOREIGN PATENT DOCUMENTS

| | | |
|---|---|---|
| CN | 1826062 A | 8/2006 |
| CN | 201379081 Y | 1/2010 |
| CN | 101978911 B | 6/2012 |
| CN | 203608859 U | 5/2014 |
| CN | 207322710 U | 5/2018 |
| CN | 109454807 A | 3/2019 |

OTHER PUBLICATIONS

Inc Molding-1f85e, The Hong Kong Polytechnic University, http://www.polyu.edu.hk/edc/tdg/showcase/492F_ITC/asiia/inc-molding-1f85e.html?page=molding, last accessed Nov. 23, 2020.
International Search Report and Written Opinion issued in PCT Application No. PCT/US20/48398, dated Dec. 2, 2020.

* cited by examiner

*Primary Examiner* — Gloria M Hale
(74) *Attorney, Agent, or Firm* — Benesch, Friedlander, Coplan & Aronoff LLP

(57) ABSTRACT

A system for making a garment includes a molding body configured to exhibit different heat profiles when contacting a continuous piece of fabric. The different heat profiles cause asymmetrical and/or eccentric deformations of the continuous piece of fabric.

15 Claims, 6 Drawing Sheets

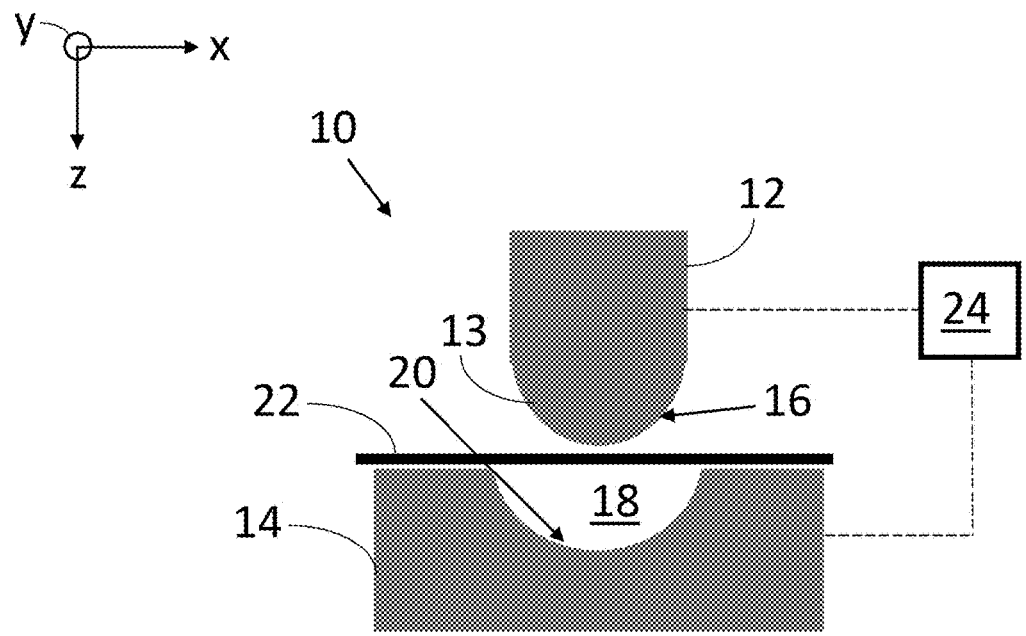
FIG. 1A
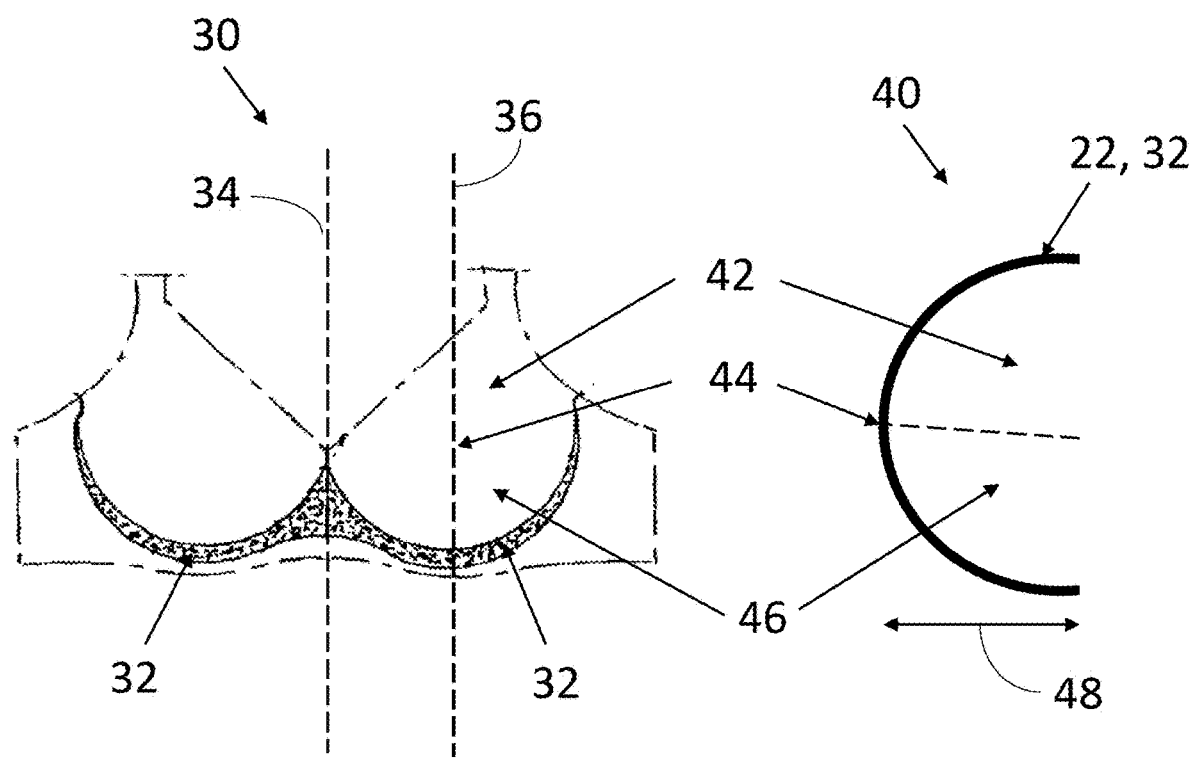
FIG. 1B  FIG. 1C

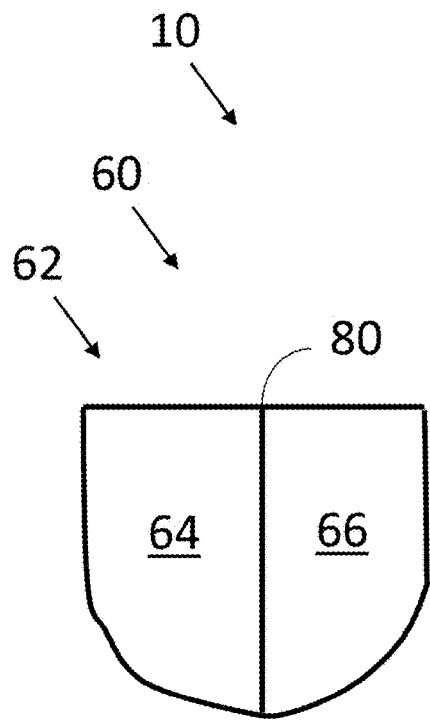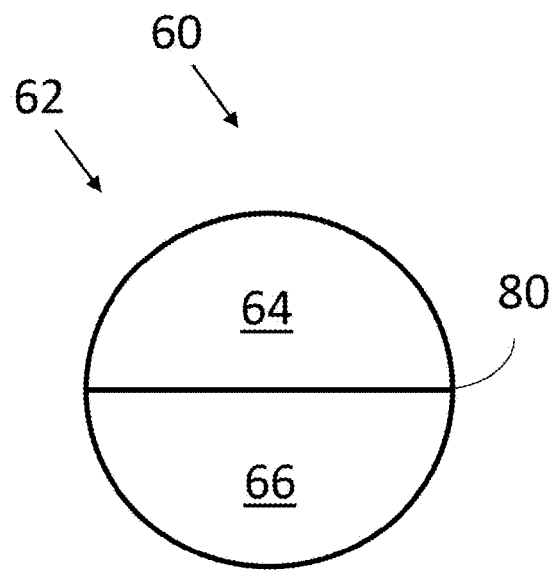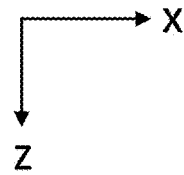
FIG. 3A  FIG. 3B

SYSTEMS AND METHODS FOR MAKING GARMENTS

CROSS-REFERENCE TO RELATED APPLICATIONS

This application claims priority to U.S. Provisional Patent Application No. 62/893,861 filed on Aug. 30, 2019, entitled "SYSTEMS AND METHODS FOR MAKING GARMENTS," the content of this application is herein incorporated by reference.

BACKGROUND

Bras or brassieres are complex garments designed to support and/or cover the wears' breasts. Bras may be designed for a variety of purposes, including enhancing a wearer's breast size, creating cleavage, comfort, and for other aesthetic, fashion or more practical considerations. Bras may be made of many parts. For example, a cut-and-sew bra or a seamed bra is made by piecing together several bra parts and sewing them together. In the past, manufacturing standards often assumed idealized, symmetrical, non-eccentric, and/or standard breast shapes and sizes that did not match most wearers' bodies or do not provide enough support and comfort. Therefore, it may be important to improve the systems and methods used for manufacturing bras to enhance the overall bra-wearing experience.

SUMMARY

In one embodiment, a system for making a garment includes a molding body configured to exhibit different heat profiles when contacting a continuous piece of fabric. The different heat profiles cause asymmetrical and/or eccentric deformations of the continuous piece of fabric.

In another embodiment, a molding body is configured to exhibit different heat profiles when contacting a continuous piece of fabric. The different heat profiles cause asymmetrical and/or eccentric deformations of the continuous piece of fabric.

BRIEF DESCRIPTION OF THE DRAWINGS

FIG. 1A shows a side view of an example of a molding system, and FIGS. 1B and 1C show a front view and a cross-sectional view, respectively, of an example molded bra cups formed using the molding system;

FIGS. 3A and 3B show a side view and a top view, respectively, of another example sleeve for use with the molding system of FIG. 1A;

DETAILED DESCRIPTION

Figure 2A:
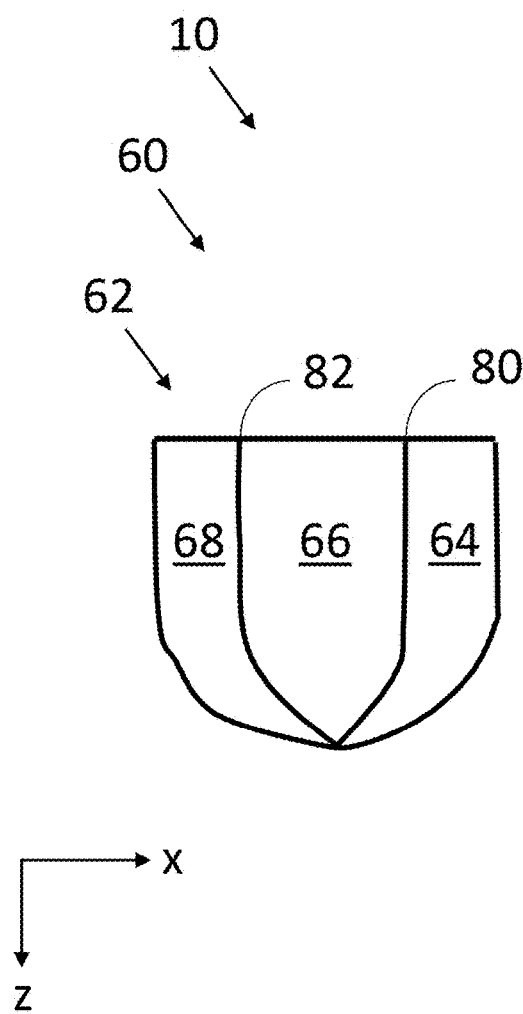
FIGS. 2A and 2B show a side view and a top view, respectively, of an example sleeve for use with the molding system of FIG. 1A.

The present disclosure is not limited in terms of the particular embodiments described in this application, which are intended as illustrations of various aspects only. Many modifications and variations can be made without departing from the scope of the invention, as will be apparent to those skilled in the art. Functionally equivalent methods within the scope of the disclosure, in addition to those enumerated herein, will be apparent to those skilled in the art from the following descriptions. Such modifications and variations are intended to fall within the scope of the appended claims. The terminology used herein is for the purpose of describing particular embodiments only, and is not intended to be limiting.

The present embodiments are related to systems and methods for making garments. For example, the systems and methods disclosed herein may be used for making molded bras having a shape or contour that is more comfortable and provides a better fit for the wearer. Bras may come in a variety of styles, including balconette, contour/molded cup, spacer molded cup, demi-cup, padded, push-up, plunge, underwire, unlined, seamed, seamless, etc. Among the variety of styles, bras with molded cups are often referred to as "molded bras" (e.g., molding pertains to the cups of the bra). Molded cups are typically made of a continuous piece of bra material. The shape of the molded cups is formed using a molding device with a molding head or body to shape the bra material. With the foregoing in mind, FIGS. 1A-1C show a side view of an example of a molding system or machine 10 and a top view and a cross-sectional view of an example of the molded cups formed thereof. The molding system 10 may include a molding body 12 having two molding heads 13 and a receiving body 14 having two cavities. The molding system 10 may also include many other sub-systems and/or components to enable the molding process. For the sake of simplicity, only one molding head 13 of the molding body 12 and one cavity of the receiving body 14 are shown in the drawing.

The molding body 12 may be configured to move towards or away from the receiving body (e.g., along the z-direction). The molding body 12 may have a solid or hollow interior, and may include a contacting surface 16 of a desired shape. In the illustrated embodiment in FIG. 1A, the molding body 12 has a contacting surface 16 (e.g., bubble mold or head).

The receiving body 14 may include a chamber or cavity 18 configured to receive the molding body 12. The receiving body 14 may include a surface 20 of any suitable shapes. In some embodiments, the surface 20 may be shaped to conform to the shape of the contacting surface 16 or to form a mating interface with the contacting surface 16. In some embodiments, the cavity 18 is sufficiently large such that the molding body 12 does not contact the surface 20 when the molding body 12 moves towards the receiving body 14. In other embodiments, the receiving body 14 may be omitted.

A piece of fabric or textile 22 (e.g., any suitable materials for forming a molded bra cup such as, cotton, silk, jute, wool, polyester, nylon, spandex, flax, acrylic, aramid, polyethylene, polypropylene, etc.) is disposed between the molding body 12 and the receiving body 14. The fabric 22 may be temporarily affixed or clamped (e.g., from the edges) to restrict movement/displacement relative to the contacting surface 16 or receiving body 14.

The molding system 10 may include a temperature adjusting system 24 coupled to the molding body 12, the receiving body 14, or both. The temperature adjusting system 24 may be configured to increase or decrease the temperature of the molding body 12, the receiving body 14, or both, which in turn affects the temperature of the fabric 22 during the molding process. In some embodiments, the temperature adjusting system 24 may be configured to heat the fabric 22 to temperatures above the transition temperature (e.g., glass transition temperature) and below the melting temperature of the fabric 22. Herein, the transition temperature of the fabric 22 refers to a temperature or a range of temperatures at which a transition takes place in the fabric 22 such that the fabric 22 transforms from a relatively rigid phase (e.g., relatively difficult to deform or stretch) to a relatively elastic phase (e.g., relatively easy to deform or stretch). The temperature to which the fabric 22 should be heated is dependent on the kind of material. The temperature adjusting system can heat the molding body 12, the receiving body 14, or both, to temperatures that range between about 50 degrees Celsius (° C.) and about 150° C., or below or beyond this range. The temperature adjusting system 24 may be configured to heat the fabric 22 by thermal convection, thermal conduction, steam, or any combination thereof. The temperature adjusting system 24 may also be configured to cool the fabric 22 to any suitable temperatures (e.g., below the transition temperature, about room temperature, or lower than room temperature).

In operation, the fabric 22 may be temporally affixed or clamped from the edge of the fabric 22 to the receiving body 14 such that the fabric 22 does not move relative to the receiving body 14. The fabric 22 may be heated to a suitable temperature, and then the molding body 12 moves towards the fabric 22 to stretch/deform the fabric 22 into a desirable shape and size as the molding body 12 is advanced towards the receiving body 14. Depending on the configuration of the molding system 10, when the molding body 12 is in contact with the fabric 22, and the stretched/deformed fabric 22 may or may not be in contact with the surface 20 of the receiving body 14. Subsequently, the molding body 12 moves away from the fabric 22 to allow release or removal of the fabric 22. The deformed fabric 22 has a shape that conforms to the shape of the contacting surface 16 of the molding body 12.

To provide context, a typical molded bra 30 includes two molded bra cups 32 made of the fabric 22. The molded bra 30 is generally symmetrical with respect to a line 34. Herein, the shape and size of the molded bra cups 32 are discussed in a cross-sectional view of the molded bra cups 32. In particular, the shape of the molded bra cups 32 (e.g., the fabric 22) is a two-dimensional profile 40 along the y-z cross-sectional plane 36. With reference to FIGS. 1B and 1C, the molded bra cups 32 may have an upper portion 42, a lower portion 46, a high point 44 between the upper portion 42 and the lower portion 46. The molded bra cups 32 may also have a depth 48. The shape of the molded bra cups 32 conforms to the shape of the molding body 12 (e.g., the contacting surface 16 in particular). In the illustrated embodiment, because the contacting surface 16 of the molding body 12 is substantially round or hemispheric and is substantially non-eccentric, the high point 44 may be half way between the upper portion 24 and the lower portion 46.

FIGS. 2A-2B and 3A-3B show examples of the molding system 10 configured to make molded bra cups with a variety of asymmetrical or eccentric shapes. Bra cups that have an asymmetrical or eccentric shapes serve a variety of purposes, including enhancing a wearer's breast size, creating cleavage, comfort, and for other aesthetic, fashion or more practical considerations. In general, molded bra cups having a closer conformity to the shapes of the wearers' breasts may provide better support and comfort. Because the majority of wearers do not have perfectly symmetrical and non-eccentric breasts, molded bra cups having the nearly perfectly symmetrical/non-eccentric shapes may not provide sufficient support and comfort, and may not provide effects, including enhancing breast size, creating cleavage, and creating the push-up effect. Therefore, it may be desirable for a molding system capable of making molded bra cups with a variety of asymmetrical or eccentric shapes.

To produce an asymmetrical or eccentric cup shape, the molding system 10 or the molding body 12 may have a sleeve 60 configured to couple (e.g., removably couple or fixedly couple), secure, or adhere to the molding body 12 and cover at least a portion of the contacting surface 16 of the molding body 12 (see FIG. 1A). The sleeve 60 may be configured to completely or partially cover the contacting surface 16 of the molding body 12. The sleeve 60 may be a modular sleeve having various portions, pieces, or domains made of different materials having different thermal conductivities. The sleeve 60 may be configured to substantially conform and adhere to the molding body 12.

When the molding body 12 moves towards the fabric 22, the sleeve 60 directly contacts the fabric 22. Due to the differences in the thermal conductivity, the heat transfer from the molding body 12 to the sleeve 60 is different. Different portions or domains of the sleeve 60 may exhibit different heat profiles that, in turn, are applied to the fabric 22. This results in a non-uniform heat distribution on the fabric 22. The portions having relatively high temperatures may deform/stretch the fabric 22 to a greater extent than the portions having relatively lower temperatures. As such, even though the molding body 12 has a substantially symmetrical/non-eccentric shape, due to the presence of the sleeve 60, the molded bra cups created by the molding body 12 and the sleeve 60 may have an asymmetrical and/or a eccentric shape to achieve the desired effects, including but are not limited to enhancing a wearer's breast size, creating cleavage, comfort, and for other aesthetic, fashion or more practical considerations.

FIGS. 2A-2B and 3A-3B show examples of the sleeve 60 having a plurality of domains 62 configured to conduct heat to the fabric 22 at different thermal conductivity values (e.g., the plurality of domains 62 are made of materials of different thermal conductivities). The sleeve 60 may be configured to couple to the molding body 12 of any shapes (e.g., bubble head, bullet head, etc.). In some embodiments, the sleeve 60 may be modular and the plurality of domains 62 may be removably coupled to one another and/or removably couple to the molding body 12. In some embodiments, the sleeve 60 may include the plurality of domains 62 in one integral piece. The sleeve 60 may be relatively flexible to conform and/or attach to the molding body 12.

The plurality of domains 62 may be made of any suitable materials to achieve a desirable thermal conductivity gradient or differences. The plurality of domains 62 may be made of thermally conductive materials, thermally insulative materials, or any combination therefore. The plurality of domains 62 may be made of metals, alloys, ceramics, polymers, composites, thermally insulative materials, or any combination thereof.

For example, some of the plurality of domains 62 may be made of materials having thermal conductivities between about 10 watts per meter-kelvin (W/(m-K)) and about 1350 W/(m-K), and some of the plurality of domains 62 may be made of materials having thermal conductivities between about 0.1 W/(m-K) to about 10 W/(m-K). The domains 62 made of materials having relatively higher thermal conductivities would have relatively higher temperatures, leading to more deformation of the fabric 22 upon contacting the fabric 22.

Figure 2B:
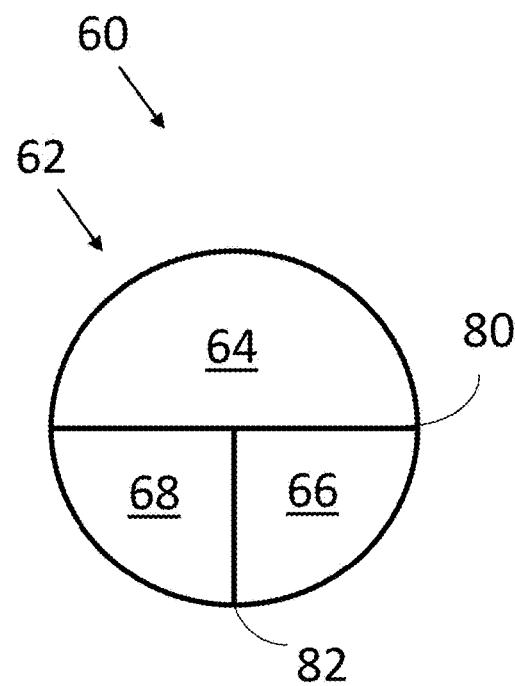

FIGS. 2A and 2B show a side view and a top view, respectively, of an example of the sleeve 60. The sleeve 60 may include three domains 64, 66, and 68. The domains 64, 66, and 68 may be made of materials having thermal conductivities 70, 72, and 74, respectively. The thermal conductivities 70, 72, and 74 may be the same or different from one another. In some embodiments, the domain 64 has a higher thermal conductivity than the domains 66 and 68, such that the upper portion 42 of the molded bra cup 32 is greater (e.g., greater in volume and/or depth) than the lower portion 46 (see FIG. 1C). Therefore, the high point 44 of the molded bra cup 32 is shifted up (e.g., towards the shoulder straps and the neck line) due to the relatively smaller lower portion 46 than the upper portion 42, thus creating a push-up effect.

In some embodiments, the domain 64 has a higher thermal conductivity than the domains 66 and 68, the domain 66 has a higher thermal conductivity than the domain 68 for one molded bra cup 32, and vice versa for the other molded bra cup 32 (the domain 68 has a higher thermal conductivity than the domain 66 for the other molded bra cup 32). Thus, the upper portion 42 of the molded bra cup 32 is greater (e.g., greater in volume and/or depth) than the lower portion 46 and within the lower portion 46, the volume and/or depth is smaller towards the line 34 (see FIGS. 1B and 1C). As such, the high point 44 of the molded bra cups 32 are shifted up and towards the line 34, which creates both push-up and cleavage effects.

In some embodiments, the sleeve 60 may include one or more insulating domains to thermally insulate the plurality of domains 62. As shown in FIGS. 2A and 2B, the sleeve 60 includes an insulating domain 80 between the domains 64 and 66 and between the domains 66 and 68. The sleeve 60 also includes an insulating domain 82 between the domains 66 and 68. The insulating domains 80 and 82 may be made of the same or different materials. The one or more insulating domains (e.g., 80 and 82) may be made of any suitable thermally insulative materials to maintain the temperature gradients or differences between the plurality of domains (e.g., the domains 64, 66, and 68). The one or more insulating domains may be made of any suitable materials that are capable of providing thermal insulation for an extended periods of time (e.g., minutes, hours, days) at the operating temperature range of the molding body 12. In some embodiments, the one or more insulating domains (e.g., 80 and 82) may be made of aerogel, fiberglass, ceramic fibers, cellulose, polyurethane, polystyrene, thermal insulation fibers and/or nanofibers, or any combinations thereof. For example, the one or more insulating domains (e.g., 80 and 82) may be made of suitable material having a thermal conductivity between about 0.01 W/(m-K) to about 1 W/(m-K), between about 0.01 to about 0.5 W/(m-K), or between about 0.01 W/(m-K) and about 0.05 W/(m-K). In some embodiments, the one or more insulating domains (e.g., 80 and 82) may be made of tantalum carbide (TaC) and/or Hafnium carbide (HfC) based materials that are capable of resisting temperatures up to about 4000° C.

FIGS. 3A and 3B show a side view and a top view, respectively, of another example of the sleeve 60. The sleeve 60 may include two domains 64 and 66 having the thermal conductivities 70 and 72, respectively. The thermal conductivities 70 and 72 are different from one another. In some embodiments, the domain 64 has a greater thermal conductivity than that of the domain 66, such that the molded bra cup 32 may have the upper portion 42 greater (e.g., greater in volume and/or depth) than the lower portion 46 (see FIG. 1C). In some embodiments, the sleeve 60 may include the insulating domain 80 made of any suitable thermally insulative material to maintain the temperature gradients or differences between the domains 64 and 66.

It should be appreciated that the FIGS. 2A-2B and 3A-3B are intended to provide non-limiting examples. The sleeve 60 may be made of any suitable number of domains 62, each made of any suitable material of suitable thermal conductivity and in any suitable shape, to make molded bra cups 32 with desirable shapes.

Figure 4:
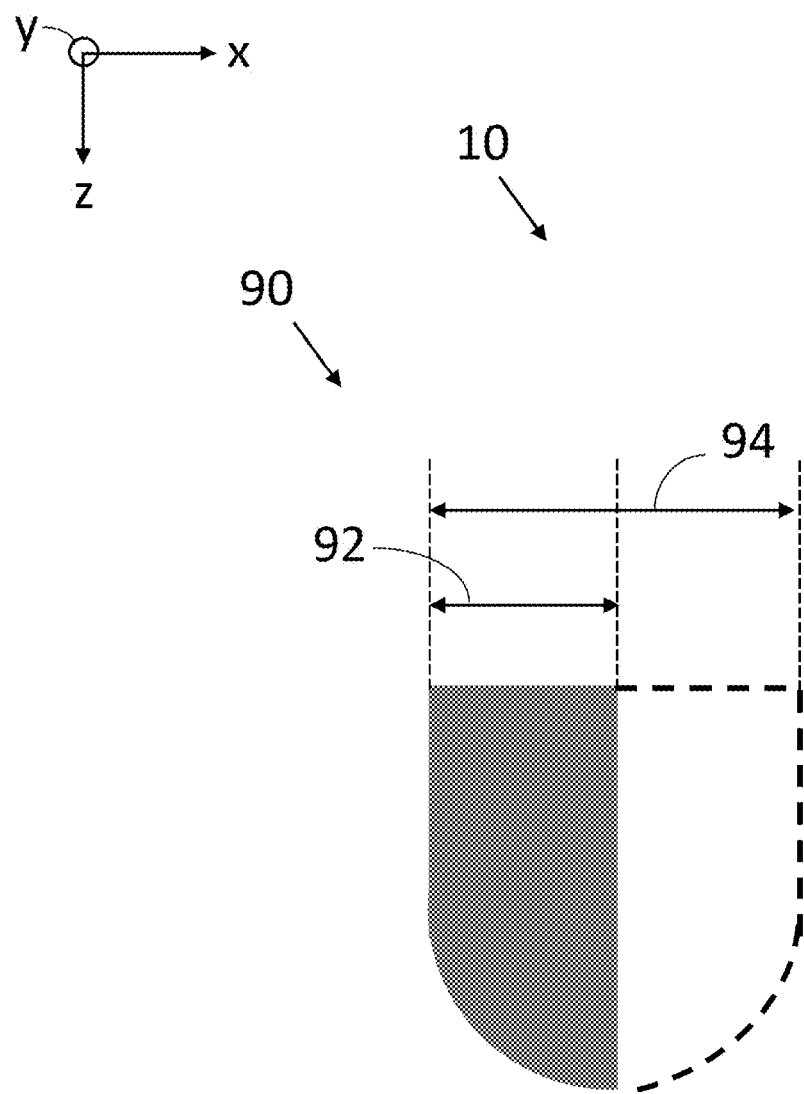
FIG. 4 shows a side view of an example of a partial molding body of FIG. 1A.

The molding system 10 may include a partial molding body 90. The partial molding body 90 may be about half, more than half, or less than half of a conventional molding body (e.g., bubble head, bullet head, etc.). FIG. 4 shows a side view of an example of the partial molding body 90. The partial molding body 90 has characteristic width 92 while a conventional molding body has a cross-sectional diameter 94. The partial molding body 90 is only a portion of a conventional molding body. For example, the characteristic width 92 is about 35% to about 65%, about 40% to about 60%, about 45% to about 55%, or about 50% of the diameter 94 of a conventional molding body. The partial molding body 90 may be configured to move towards the fabric 22 to form the molded bra cups 32. In some embodiments, the partial molding body 90 may be hollow molding body 12 that has a shell or an outer layer of any suitable sizes and shapes and has an inner hollow portion or cavity (e.g., a hollow interior). The exterior of the hollow molding body may be substantially the same as a conventional molding body, and the inner hollow portion or the hollow interior may be any suitable fraction of the volume of the molding body. For example, the hollow interior may be about 25% to about 75%, about 35% to about 65%, about 40% to about 60%, about 45% to about 55%, or about 50% of the volume of the molding body. The inner hollow portion may be formed of one or more cavities. The inner hollow portion may have any suitable sizes or shapes and may have a gradient profile that may have one or more convex.

In some embodiments, the partial molding body 90 may be oriented to contact the portion of the fabric 22 corresponding to the upper portion 42 of the molded bra cups 32 (see FIG. 1C), such that the upper portion 42 of the molded bra cups 32 formed by the partial molding body 90 is greater (e.g., greater in volume and/or depth) than the lower portion 46. In some embodiments, the partial molding body 90 may be oriented to contact any suitable portion of the fabric 22 to adjust the shape, size, and the high point 44 of the molded bra cups 32 as to provide effects including enhancing a wearer's breast size, creating cleavage, comfort, and for other aesthetic, fashion or more practical considerations. In some embodiments, the gradient profile of the inner hollow portion of the partial molding body 90 may have one or more convex configured to shape the molded bra cups 32 as to provide effects including enhancing a wearer's breast size, creating cleavage, comfort, and for other aesthetic, fashion or more practical considerations.

Figure 5:
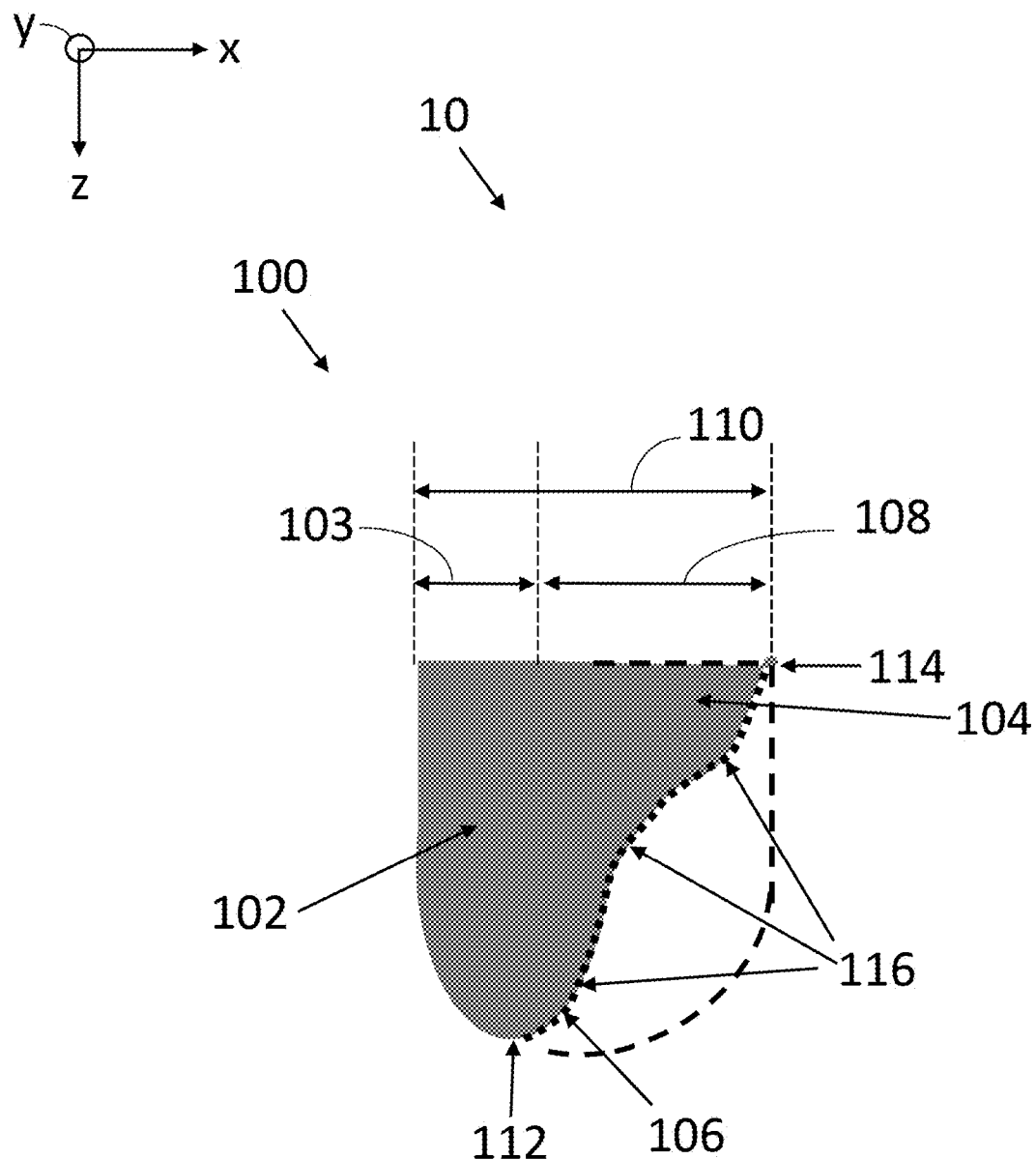
FIG. 5 shows a side view of an example of a gradient molding body of FIG. 1A.

The molding system 10 may include a gradient molding body 100 as shown in FIG. 5. The gradient molding body 100 may include a first half 102 and a second half 104. The first half 102 may be about half, more than half, or less than half of a conventional molding body (e.g., bubble head, bullet head, etc.). The second half 104 may have a gradient profile 106. FIG. 5 shows a side view of an example of the gradient molding body 100. The first half 102 has a characteristic width 103 and the second half 104 has a characteristic width 108, while a conventional molding body (e.g., bubble head, bullet head) has a cross-sectional diameter 110. The gradient molding body 100 is only a portion of a conventional molding body. For example, the characteristic width 103 is about 35% to about 65%, about 40% to about 60%, about 45% to about 55%, or about 50% of the diameter 110. The characteristic widths 103 and 108 may or may not add up to the diameter 110.

The gradient profile 106 extends from a high point or a tip 112 to a base 114 of the gradient molding body 100. The gradient profile 106 may have one or more convex 116 configured to shape the molded bra cups 32 as to provide effects including enhancing a wearer's breast size, creating cleavage, comfort, and for other aesthetic, fashion or more practical considerations. The gradient molding body 100 may be configured to move towards the fabric 22 to form the molded bra cups 32. The gradient molding body 100 may be oriented to contact the appropriate portion of the fabric 22. The portion of the fabric 22 that is in contact with the first half 102 is stretched/deformed to a greater depth or extent than that in contact with the second half 104. As such, the gradient molding body 100 is configured to create different depths in different areas of the molded bra cups 32.

Figure 6:
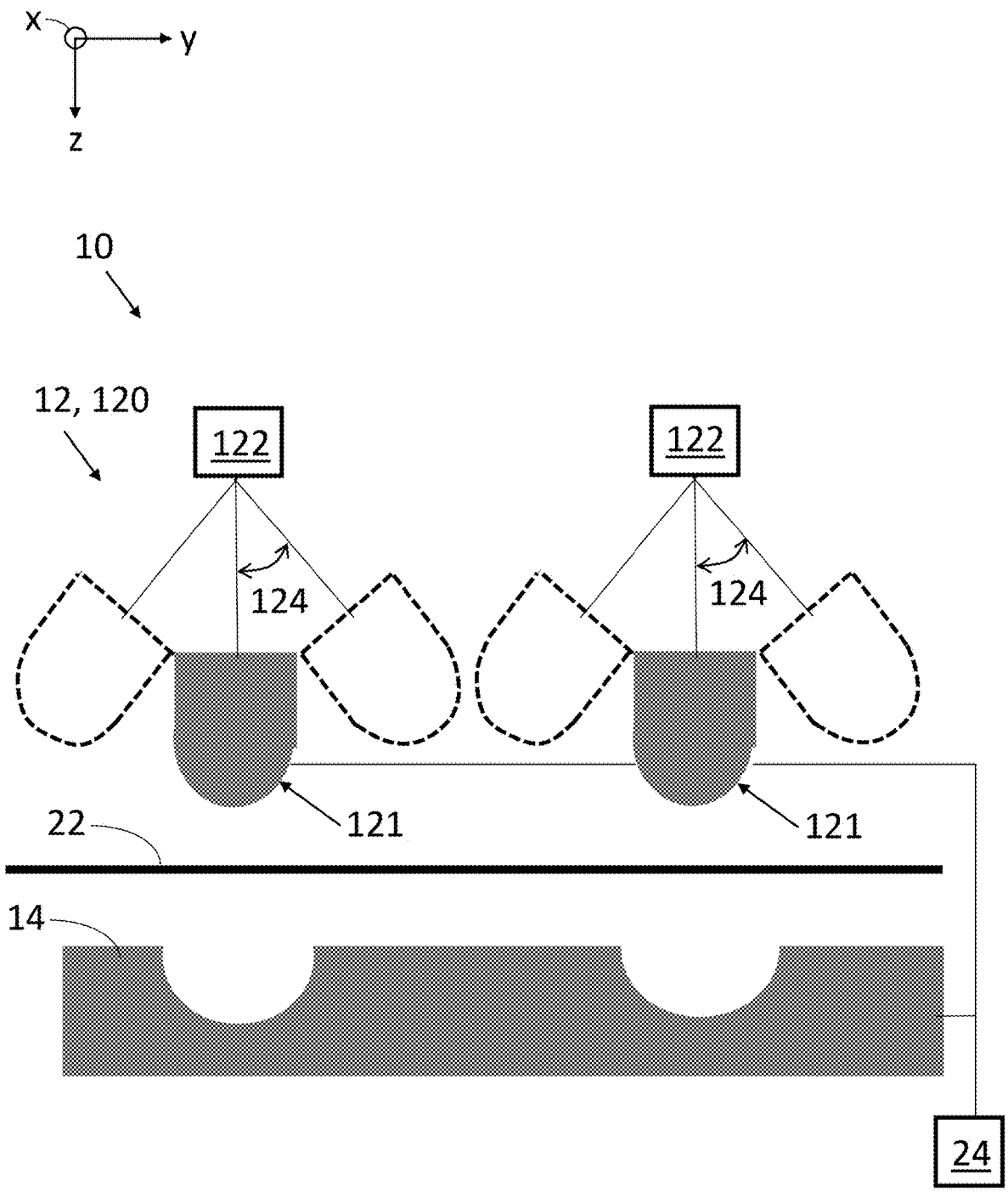
FIG. 6 shows a side view of an example molding system of FIG. 1A having a rotational molding body.

FIG. 6 shows a side view of another example of the molding system 10. The molding system 10 shown in FIG. 6 is the same as the molding system 10 shown in FIG. 1A, except for the molding body 12 is configured to have rotational freedom. In the illustrated embodiment, the molding system 10 includes a rotational molding body 120 having two molding heads 121, each coupled to a rotation system 122 configured to rotate the molding heads 121 in radial angles 124 between 0 degree and 90 degrees. The molding body 12 may be a conventional molding body (e.g., bubble head, bullet head) or may be the partial molding body 90 or the gradient molding body 100 described above. The rotational molding body 120 may be configured to move up and down along the z-direction and the molding heads 121 may rotate at different radial angles 124 to stretch/deform the fabric 22 and create different depths in different areas of the molded bra cups 32.

In some embodiments, the rotational molding body 120 and the receiving body 14 may be configured to join (e.g., the rotational molding body 120, the fabric 22, and the receiving body 14 are in contact with one another) during the molding process. In some embodiments, only the rotational molding body 120 is in contact with the fabric 22 during the molding process. In some embodiments, the receiving body 14 may be omitted. The rotational molding body 120 is configured to move in the z-direction and rotate in any suitable radial angles 124 to achieve effects including enhancing a wearer's breast size, creating cleavage, comfort, and for other aesthetic, fashion or more practical considerations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The invention claimed is:

1. A molding system for molding a garment or components of a garment, comprising:

a molding body configured to provide different heating element profiles to contact a continuous piece of fabric to cause asymmetrical and/or eccentric deformations of the continuous piece of fabric and wherein the molding body comprises a first half and a second half, and the second half has a gradient heat profile.

2. The molding system of claim 1, wherein the first half has a characteristic width that is about 35% to about 65% of a cross-sectional diameter of the molding body.

3. The molding system of claim 1, wherein the second half comprises one or more convex portions configured to shape the continuous piece of fabric.

4. The molding system of claim 1, wherein the molding body is configured to have rotational freedom.

5. The molding system of claim 1, wherein the molding body comprises two molding heads that are configured to rotate at different radial angles to create different depths in different areas of the continuous piece of fabric.

6. A molding system for molding a garment or components of a garment, comprising:

a molding body configured to provide different heating element profiles to contact a continuous piece of fabric to cause asymmetrical and/or eccentric deformations of the continuous piece of fabric and wherein the molding body has a hollow interior.

7. The molding system of claim 6, wherein the hollow interior is about 25% to about 75% of a volume of the molding body.

8. The molding system of claim 6, wherein the hollow interior has one or more convex portions.

9. The molding system of claim 6, wherein the molding body is configured to have rotational freedom.

10. The molding system of claim 6, wherein the molding body comprises two molding heads that are configured to rotate at different radial angles to create different depths in different areas of the continuous piece of fabric.

11. A molding system for molding a garment or components of a garment, comprising:

a molding body configured to provide different heating element profiles to contact a continuous piece of fabric to cause asymmetrical and/or eccentric deformations of the continuous piece of fabric and wherein the molding body comprises a sleeve configured to couple to the molding body to cover at least a portion of a contacting surface between the molding body and the continuous piece of fabric.

12. The molding system of claim 11, wherein the sleeve comprises a plurality of domains made of materials of different thermal conductivities.

13. The molding system of claim 12, wherein the plurality of domains comprise one or more insulating domains to thermally insulate the plurality of domains.

14. The molding system of claim 11, wherein the molding body is configured to have rotational freedom.

15. The molding system of claim 11, wherein the molding body comprises two molding heads that are configured to rotate at different radial angles to create different depths in different areas of the continuous piece of fabric.

* * * * *